(12) United States Patent
Sundermeyer et al.

(10) Patent No.: US 7,587,679 B1
(45) Date of Patent: Sep. 8, 2009

(54) SYSTEM AND METHOD FOR DISPLAYING ELEMENTS USING A SINGLE TAB

(75) Inventors: Mike Sundermeyer, Palo Alto, CA (US); Michael Gough, Middletown, CA (US); Andrew Lin, San Francisco, CA (US); Alain Dumesne, Scotts Valley, CA (US); Gerard Knight, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 322 days.

(21) Appl. No.: 11/212,940

(22) Filed: Aug. 25, 2005

Related U.S. Application Data

(60) Provisional application No. 60/604,826, filed on Aug. 25, 2004.

(51) Int. Cl.
*G06F 3/00* (2006.01)
*G06F 3/14* (2006.01)

(52) U.S. Cl. .................. 715/777; 715/765; 715/835

(58) Field of Classification Search ................ 715/719, 715/764, 765, 777, 810, 822, 823, 835, 838, 715/977
See application file for complete search history.

(56) References Cited

U.S. PATENT DOCUMENTS

| | | | | |
|---|---|---|---|---|
| 4,899,377 A | * | 2/1990 | Bauer et al. ................. 379/354 |
| 5,515,497 A | * | 5/1996 | Itri et al. ...................... 715/776 |
| 5,668,964 A | * | 9/1997 | Helsel et al. ................. 715/776 |
| 5,745,718 A | * | 4/1998 | Cline et al. .................. 715/777 |
| 6,043,816 A | * | 3/2000 | Williams et al. ............ 715/783 |
| 6,310,634 B1 | * | 10/2001 | Bodnar et al. ............... 715/854 |
| 6,857,128 B1 | * | 2/2005 | Borden et al. ................. 725/39 |
| 7,036,092 B2 | * | 4/2006 | Sloo et al. ..................... 715/841 |
| 7,249,325 B1 | * | 7/2007 | Donaldson ................... 715/777 |
| 2004/0001106 A1 | * | 1/2004 | Deutscher et al. ........... 345/838 |
| 2004/0113948 A1 | * | 6/2004 | Shahrbabaki et al. ....... 345/777 |
| 2006/0085735 A1 | * | 4/2006 | Shimizu ...................... 715/512 |

OTHER PUBLICATIONS

IBM, "Extended Notebook Control", Feb. 1999, IBM, v 42, n 418, 1 page.*
IBM, "Previous Button and Tab-Extensions for Accessing Hidden Windows", Sep. 1994, IBM, v 37, n 9, p. 471-474.*
Screen shot taken from Microsoft® Visual Studio®, known by at least one inventor at least as early as Aug. 31, 2004.
Screen shot taken from Microsoft® Visual Studio®, known by at least one inventor at least as early as Aug. 18, 2005.

* cited by examiner

*Primary Examiner*—X. L Bautista
(74) *Attorney, Agent, or Firm*—Fish & Richardson P.C.

(57) ABSTRACT

A system and method provides a tabbed user interface in which labels may be used to select one of a plurality of data elements, but only the selected label is displayed with a tab, the other labels being displayed without a tab. Feedback, such as by underlining a label when the user hovers the mouse over it, is provided to allow the user to identify that an action will occur if one of the non-tabbed labels is clicked.

33 Claims, 7 Drawing Sheets

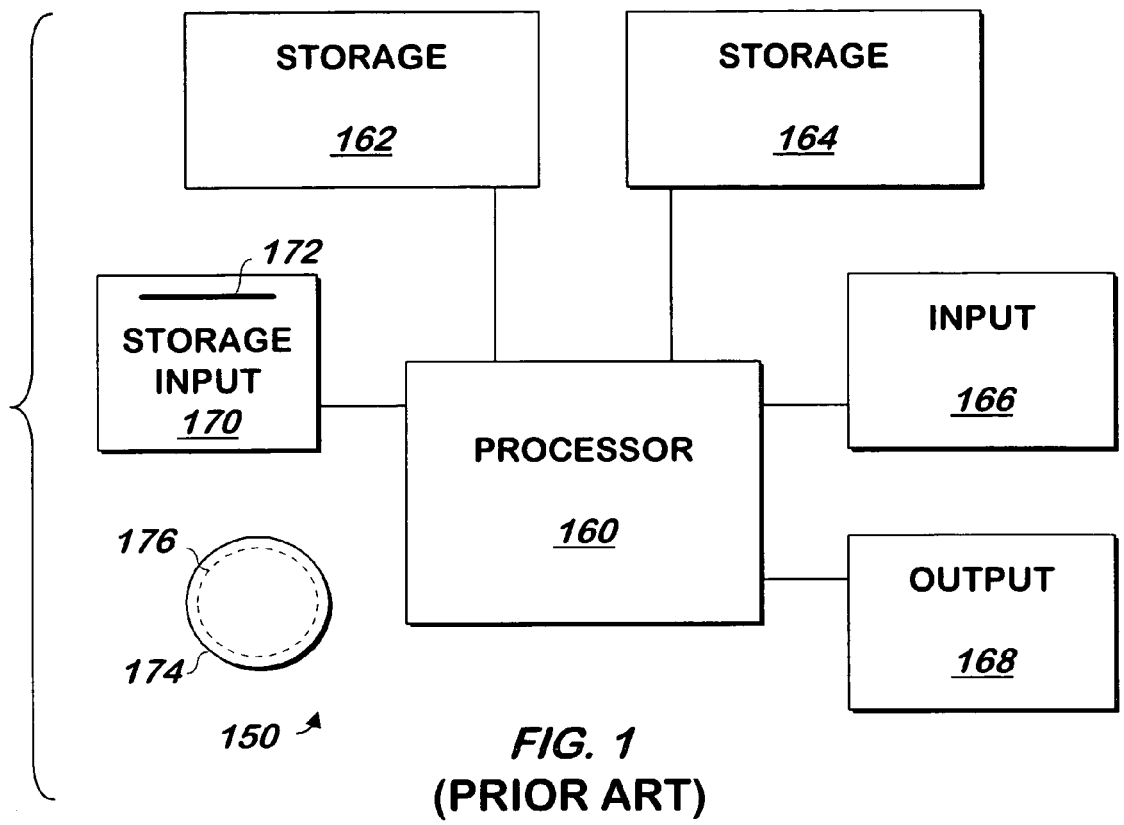
FIG. 1
(PRIOR ART)
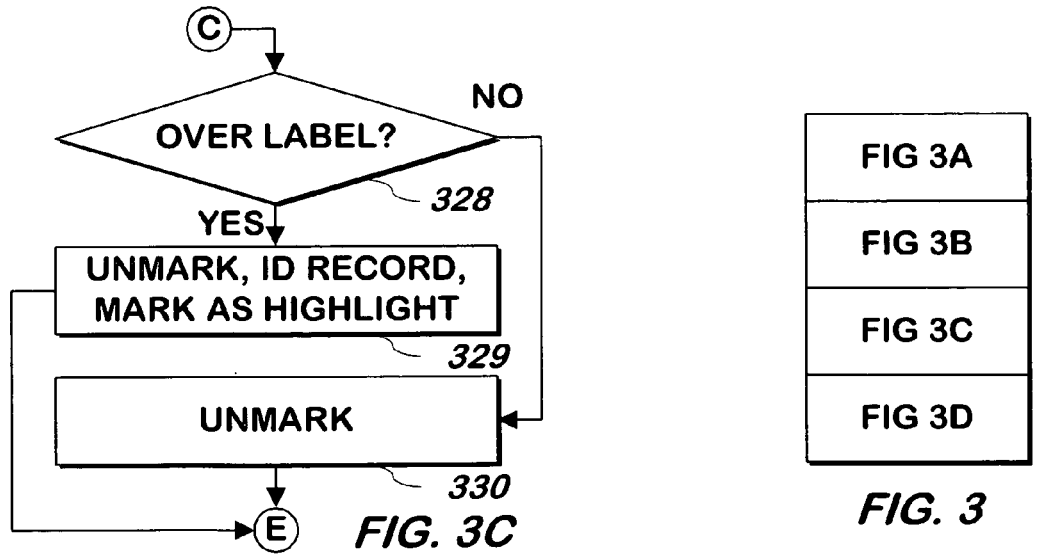
FIG. 3C
FIG. 3

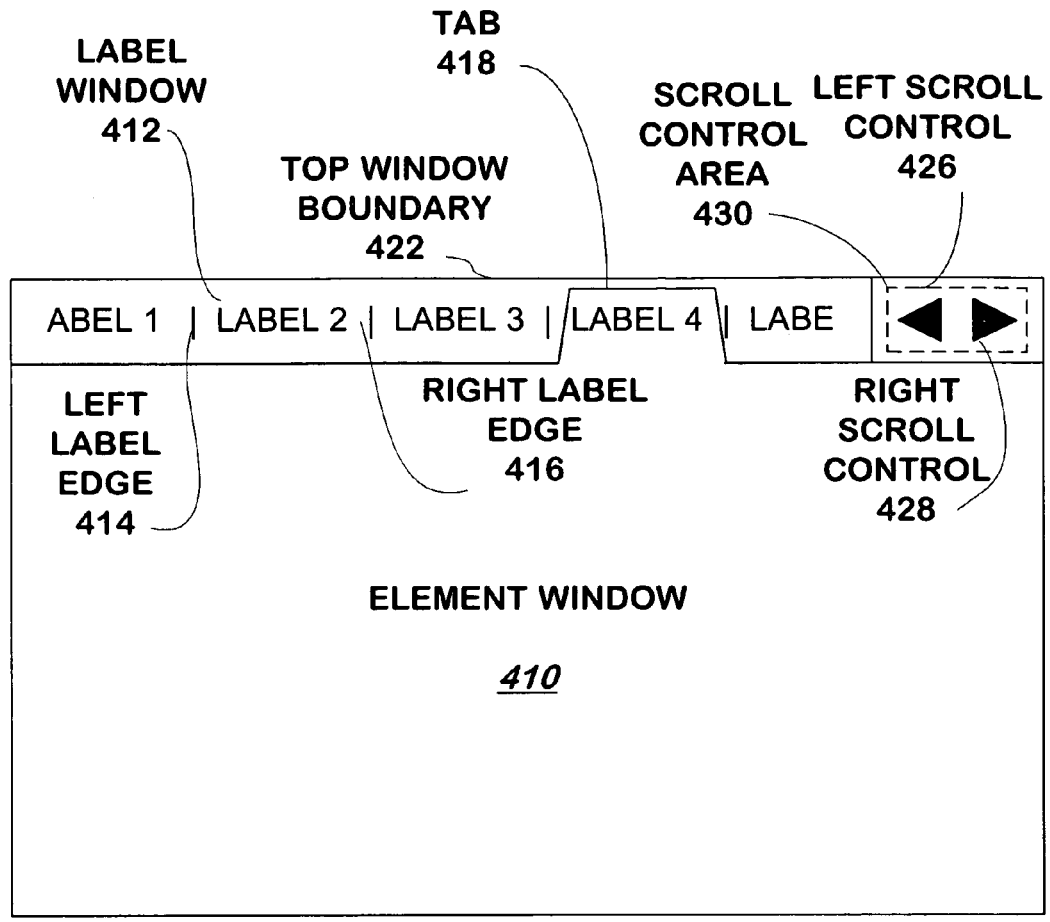
*FIG. 4*
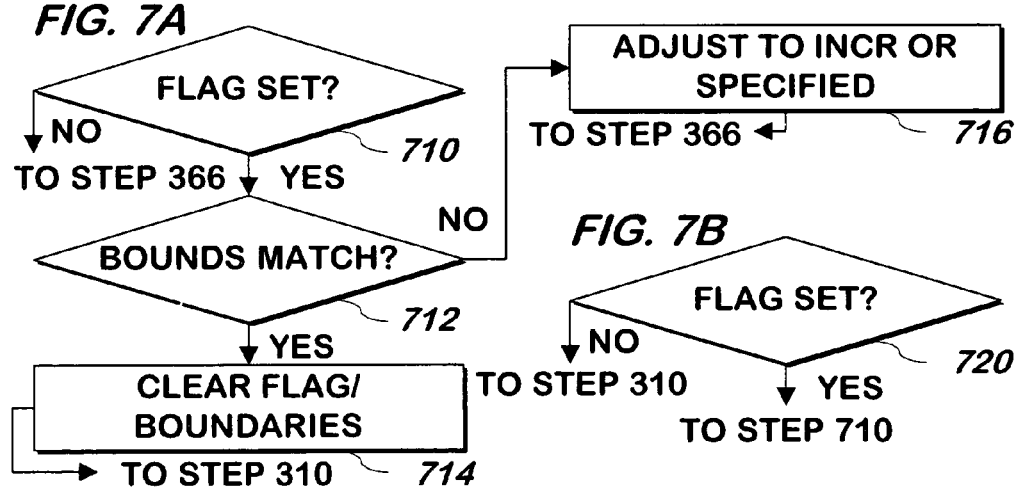

SYSTEM AND METHOD FOR DISPLAYING ELEMENTS USING A SINGLE TAB

CROSS REFERENCE TO RELATED APPLICATIONS

This application claims the benefit of U.S. Provisional Patent Application Ser. No. 60/604,826, entitled, "Method and Apparatus for Displaying Elements Using a Single Tab" filed by Mike Sundermeyer, Michael Gough, Andrew Lin, Alain Dumesne and Gerard Knight, on Aug. 25, 2004, having the same assignee as the present application, and is hereby incorporated by reference in its entirety.

FIELD OF THE INVENTION

The present invention is related to computer software and more specifically to user interface computer software.

BACKGROUND OF THE INVENTION

Conventional computer software interacts with the user via its user interface. As computer software became more complex, its ability to display information exceeded the space on the screen that could be used to display it. As a result, the information was displayed as separate elements, and various selection schemes were employed to allow the user to select the element that the user wished to have displayed. When a user used the selection scheme to select an element, the other elements that were mutually exclusively selected using that scheme were partially or fully hidden, and the selected element was displayed.

One such selection scheme in use is a tabbed selection scheme. In a tabbed selection scheme, each element of several mutually-exclusively displayed elements is displayed with a tab, which can look like the tab on a paper file folder or paper organizer booklet. Each tab may be labeled with an indication of the element that tab represents. The tab corresponding to the currently selected element is displayed in a manner that makes it appear as though it is in front of the other tabs and is connected to the remainder of the element it represents, and that element is also displayed. Some or all of the other tabs are also displayed to allow the user to see the other choices that the user can make.

There are many benefits to employing a tabbed user interface. The user can determine which element is being displayed by looking for the frontmost tab. A tabbed user interface is familiar to users because of its similarity to real-world applications, such as file folders and organizers. Furthermore, tabbed user interfaces are familiar to many users of computer programs, who readily understand that the tabs may be used to select from among various elements represented by the tabs and their labels.

However, as the amount of information displayed on a screen continues to grow, the tabbed approach is sub optimal for several reasons. First, the other tabs corresponding to elements available, but not selected can provide a cluttered appearance on the screen. The lines and curves that define the edges of the tabs adds a significant amount of visual information that contributes to the clutter on the screen. The tabs may be displayed using different colors, and this jumble of colors makes the overall appearance look more disjoint. Additionally, the many lines and other visual information used to display multiple tabs slows the user attempting to scan the labels or other information on the tabs.

Second, in an attempt to cram more and more tabs onto a display screen, some software developers employ two or more rows of tabs. Not only does this occupy more space on the screen, reducing the available space to be used to display the selected element, it also makes for a more confusing user interface, because the layout of the tabs on the screen changes according to which tab is selected. For example, when a user selects a tab on the second row of tabs, to allow the selected tab to appear to be connected to the element displayed, that tab is moved to the row nearest the element. Some software using multiple rows of tabs causes the entire second row to also be moved down, in a misguided attempt at keeping the relative positions of the tabs on a row in the same order. Although in this approach, the relative positions of the tabs on a given row remain the same, the user loses track of the exact position of all of the tabs. Other software moves only the selected tab to the row nearest the element, and the formerly selected tab is moved into another row to take the position of the tab being moved, either at the same relative position or a different position of the selected tab. This approach makes little intuitive sense to the user and makes it difficult to find the formerly selected tab. Still other software rearranges the tabs in other ways when a tab in the second row is selected, making it difficult for the user to find another tab using the knowledge of their former locations.

Because any solution to the above problem will appear differently than the familiar tabbed user interface, it can be helpful to display controls to the user in a manner that makes clear to the user that a certain portion of the screen can be used to control the display of information on the screen. In contrast, in the conventional Visual Development Studio commercially available from Microsoft Corporation, certain elements that could be displayed using tabs are instead displayed using text. However, the text always looks like text, and so it is difficult for the user to identify that the non-tabbed text may be used like a conventional tab.

What is needed is a system and method that retains at least some of the readily understood appearance of a tabbed user interface so that users will instantly know how to use it, without employing the aspects that provide the cluttered appearance on the screen or the confusing rearrangement of the location of user interface controls used to select an element from among those listed, and yet makes it clear to the user that the user interface can be used to alter the display of information.

SUMMARY OF INVENTION

A system and method displays a user interface that allows users to select elements, but employs a single row of element labels, only the currently-selected one of which contains a tab. As users move the mouse over a label, the label may be highlighted to indicate that it may be selected. If there are more labels than the space available in which to display them, a scroll control is used to scroll through the element labels. The user may use the scroll control if necessary to bring a desired element label into the space provided, and then select that label. The system and method then displays the element for processing, and its label is displayed on a tab connected to the element. The user can then edit the label, remove the element from the list of elements displayed, or add another element to the list of elements displayed.

Because a tab is used for the currently selected element, users familiar with tabbed user interfaces will instantly see how to use it. Because the element labels do not change their relative positions when selected, confusion is avoided. Because tabs are not used on the elements not selected, the user can more quickly scan the information that would have been displayed in the multitude of tabs, and a less-cluttered look is presented to the user. Because a single row of labels are employed, less screen space is devoted to the user interface, allowing more of the other information desired to be displayed on the screen to be displayed.

BRIEF DESCRIPTION OF THE DRAWINGS

FIG. 1 is a block schematic diagram of a conventional computer system.

FIG. 4 is an illustration of a tabbed user interface according to one embodiment of the present invention.

FIGS. 7A and 7B are flowcharts illustrating steps to be added to FIG. 3B to animate the movement of labels in the label window according to one embodiment of the present invention.

DETAILED DESCRIPTION OF A PREFERRED EMBODIMENT

Figure 2:
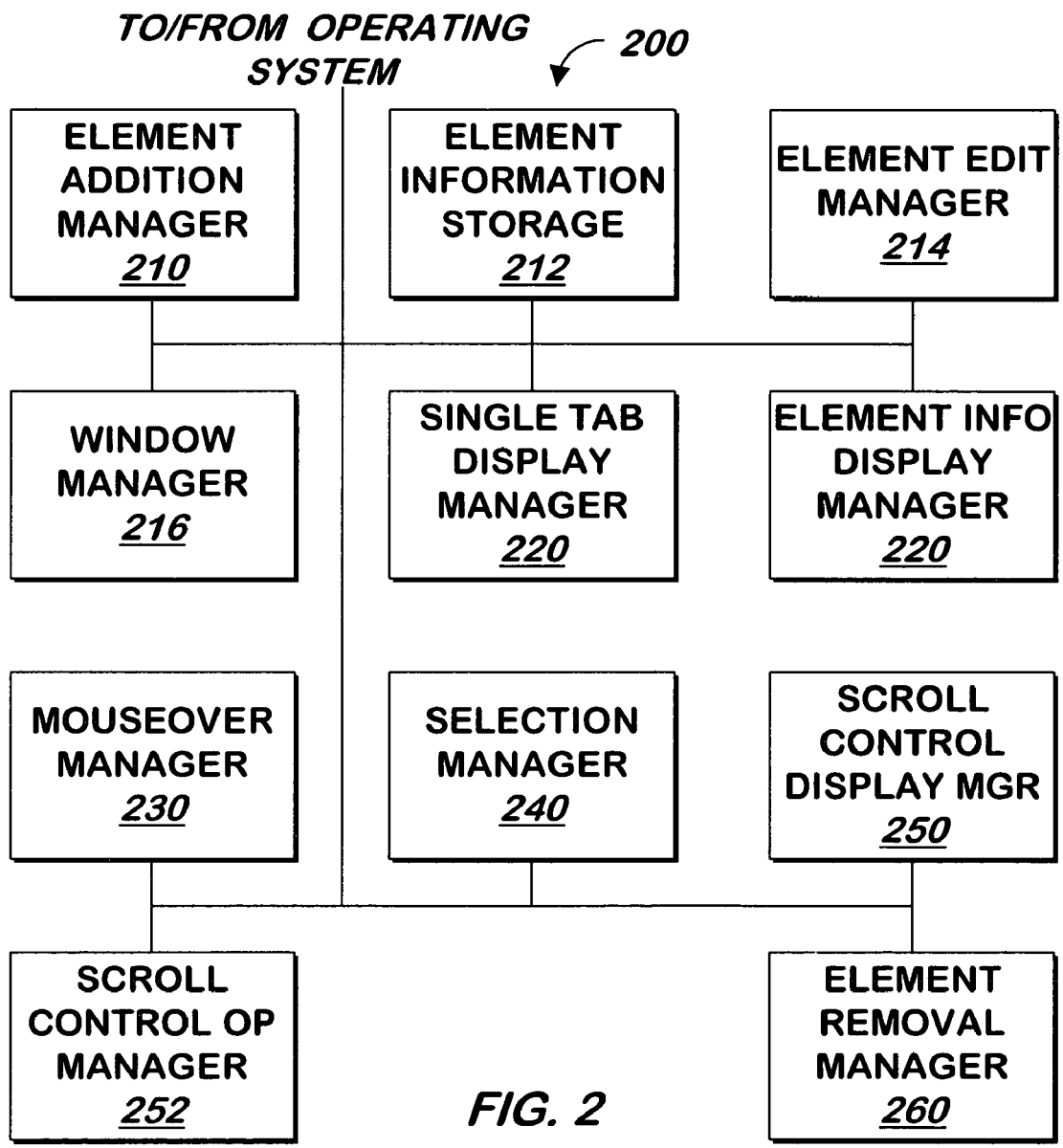
FIG. 2 is a block schematic diagram of a system for displaying a tabbed user interface according to one embodiment of the present invention.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond, Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Referring now to FIG. 2, a system for displaying a tabbed user interface is shown according to one embodiment of the present invention. In one embodiment, all communication into or out of system 200 is made via operating system (not shown), which is coupled to conventional user input/output devices, such as a conventional monitor, keyboard and mouse.

A User Adds an Element

The system and method may allow the user to select for display from an existing set of elements using the present invention, or allow the user to add elements to be selected for display and remove them as described herein. Each element may correspond to any object or set of objects to be displayed to a user. For example, in one embodiment, an element may correspond to a file or a portion of a file.

In one embodiment, a user may use a user interface provided by element addition manager 210 to add an element to the set of elements that may be selected for display by system 200. The user may add either a new element or an existing element, for example, an existing file (not shown). For example, if the elements are files opened by the user for viewing in a conventional application program, the user may specify the addition of the element to the set of elements via a menu command, such as "file-new" or "file-open".

In one embodiment, the user uses a menu displayed by window manager 216 to specify the addition of an element to the set of elements to be displayed. Although a menu command may be used, any conventional user interface control may be used to add the element to the set of elements to be displayed and selected as described herein. When the user uses such an interface command to add an element, window manager 216 is signaled by the operating system, and window manager 216 signals element addition manager 210 with the type of addition: a new file or an existing file.

In the embodiment in which an element may be added in a variety of manners, element addition manager 210 may be signaled by the operating system in a manner that allows element addition manager 210 to determine the type of addition the user wishes to perform, such as adding a new file or adding an existing file to the set of elements to be displayed.

When element addition manager 210 receives the signal from window manager 216 or the operating system, element addition manager 210 determines if additional information is necessary, and if so, retrieves the additional information from the user. For example, if the user used the user interface to indicate the user wishes to add an element corresponding to an existing file (e.g. using a "file-open" command), element addition manager 210 requests the additional information (e.g. the filename, via a file selection dialog box). When element addition manager 210 has determined that it has the information it requires to initialize the element, element addition manager 210 adds an element record to a list of element records stored in element information storage 212.

Adding the Element Record to the List of Element Records

Element information storage 212 may be disk or memory storage which may consist of a table or list of information organized into records associated with each element capable of being displayed by system 200. The element record contains information corresponding to the element that is to be displayed for that element in label window 412 and element window 410 of FIG. 4.

To generate the information for an element record for the element, element addition manager 210 generates a unique element identifier of the element record and an initial label text to display in label window 412 for that element. In one embodiment, the initial label text contains the word "Untitled-", plus the text corresponding to the unique identifier, e.g. "Untitled-1". Element addition manager 210 adds these items to the new record it generates, as well as a handle to, or other identifier of, the contents of the element to be displayed in element window 410. For example, the handle element addition manager 210 adds to the element record may be received from the operating system, when element addition manager 210 requests that the file selected by the user as described above be opened. If the element corresponds to a new file, element addition manager 210 requests operating system to open a new file, receives a handle to the file from operating system, and element addition manager 210 adds this handle to the element record.

Element addition manager 210 then marks the element record it adds as "selected", for example, by setting a "selected" field in the element record to true, in order to indicate that the element corresponding to the record should be displayed as the selected element as described below. Element addition manager 210 un-marks the formerly selected element record so that only one element record is marked as selected when the element labels are displayed to the user as described below.

Element addition manager 210 next identifies the screen width to be used to display the label text, using conventional techniques, such as requesting the width of the characters in the label text from the operating system, and adds an amount for a border, and stores the total as the label text width in the element record.

Element addition manager 210 then identifies the right edge of the label text for that element by summing its stored label text width with the right edge of the label text of the element stored at the end of the list of element records (or zero if the element record is the first record in the list) and stores the result in the element record as the right edge of the element record.

For example, if there are 9 element records stored in element information storage, each with a label text width of 15, when element addition manager 210 adds the tenth one into it, assuming it also has a label text width of 15, element addition manager 210 adds the label text width of 15 and a right edge of 150 to the element record for the tenth element.

Element addition manager 210 checks the right edge of the label text of the element to determine whether it will be displayed within the label window 412. In one embodiment, the label window 412 is an area in which labels are displayed as described here in, and need not be a separate operating system window. In one embodiment, the label window 412 has a left and right boundary that indicates the label text that will appear in the window. Using the example above, if the left boundary of the label window is set to 0, and the right boundary is set to 90, the label text of the first six element records will be displayed in the label window 412. In one embodiment, the right and left boundary of the label window are stored in element information storage 212.

In one embodiment, the left and right boundaries of the label window stored in element information storage 212 are initialized by window manager 216 that initializes the operating system window in which label window 412 is displayed.

In one embodiment, when element addition manager 210 adds an element record, it adjusts the boundaries of the label window 412 to ensure that the label text for the newly added element will be visible in the label window 412. If the right edge of the label text is greater than the right boundary of the label window, element addition manager 210 adds an adjustment amount to the right boundary of the label window so that the right boundary will equal or exceed the right edge of the label text of the newly added element record, and adds the adjustment amount to the left boundary of the label window 412. If the left edge of the label text is less than the left boundary of the label window of the newly added element record, element addition manager 210 subtracts an adjustment amount from the left boundary of the label window 412 so that the left boundary is equal to the right boundary of the element record preceding the newly added element record in the list, and subtracts the adjustment amount from the right boundary of the element window as well. The left edge of any label text or record is identified by adding one unit to the right edge of the preceding element record in the list of element records. If an element record is the first element record in the list, its left edge is considered to be zero.

When element addition manager 210 has completed adding the element record and optionally adjusting the boundaries of the label window in element information storage 212, element addition manager 210 signals scroll control display manager 250.

Another Embodiment

Elements May not be Added

In one embodiment, when system 200 starts up, element addition manager 210 reads a file (not shown) which contains elements to be added to the list of elements in element information storage 212 described above and builds a new record in element information storage 212 for each element in the file to be added to the list as described above. In one embodiment, the file may contain an element, which may be a default element, such as an element with blank contents, which is automatically opened and selected when system 200 starts. In one embodiment, the file may contain at least one element that the user had been utilizing during the previous use of system 200. In one embodiment, the file may contain both a default element and the most recently used at least one element. Such an arrangement may be used in embodiments in which the user is allowed to add elements as described above, as well as in embodiments in which the user is not allowed to add elements as described above.

Display the Scroll Controls.

When signaled, scroll control display manager 250 displays the scroll controls 426, 428 in a scroll control area 930 designated by window manager 216 for that purpose. In one embodiment, each scroll control 426, 428 is an arrow, displayed either "grayed out," to indicate that there are no labels beyond those displayed in the direction of the arrow of the scroll control 426, 428, and therefore the control 426, 428 is not active, or in black or a darker color to indicate that there are labels beyond those displayed and in the direction of the arrow of the scroll control 426 and therefore the control 426, 428 is active, i.e. it can be used to allow the user to view additional label text in the direction indicated.

To display the scroll controls, scroll control display manager 250 checks the last element record in the list of element records stored in element information storage 212 and compares the right edge of the label text in that element record with the right boundary of the label window 412 stored in element information storage 212. If the right boundary is greater than the right edge of the label window, scroll control display manager 250 displays scroll control 428 using one color, such as black, to indicate the control 428 is active; and otherwise, scroll control display manager 250 displays scroll control 428 using a different color, such as a lighter, gray version of the color used to indicate the control is active, in order to indicate the control 428 is inactive.

Scroll control display manager 250 also determines whether the left boundary of the label window 412 stored in element information storage 212 is greater than zero. If so, scroll control display manager 250 displays scroll control 426 using the color that was used to indicate the control 428 is active; and otherwise, scroll control display manager 250 displays scroll control 426 using gray or the version of the color that is used to indicate control 428 is inactive, in order to indicate control 426 is inactive.

In one embodiment, as it displays the color of each control 426, 428, scroll control display manager 250 also stores in element information storage 212, for each control 426, 428, an indication of the active state of the control: either true or false.

In one embodiment, each scroll control 426, 428 is displayed in one half (right or left) of a scroll control area, whose coordinates are designated by window manager 216 to be adjacent to the label window 412 and the element window 410. Window manager 216 stores in element information storage 412 the coordinates (e.g. the X and Y coordinates of the upper left and lower right corners, with coordinates 0,0 corresponding to the upper left hand corner of the window containing scroll control area) of the scroll control area and scroll control display manager 250 uses the coordinates to display the scroll controls. In one embodiment, the label window 412 is above a portion of, and adjacent to, the element window 410, and the scroll control area is above the element window 410. Borders make the label window and an area containing the scroll control area appear to be the same height, and the total width of the border of the label window 412 and area containing the scroll control area is the same as the width of the border surrounding the element window 410. In one embodiment, the right boundary of the label window 412 and left boundary of the area containing the scroll control area does not contain a border between them so that the area containing the scroll control area and the label window 412 have an appearance of being part of the same space. In other embodiments, the area 430 containing the scroll controls is placed elsewhere relative to label window 412 and element window 410.

When scroll control display manager 250 has completed displaying the scroll controls 426, 428 as described above, scroll-control display manager 250 signals single tab display manager 220.

Another Embodiment

Scroll Control Operates a Drop Down List

In one embodiment, described in more detail below, instead of displaying the scroll controls as described above, or in addition to them, a single "scroll control" 650 is displayed as active if the right edge of the label text in that element record is greater than the right boundary of the label window 412 stored in element information storage 212 or the left boundary of the label window 412 is greater than zero, and otherwise, the scroll control 650 is displayed as inactive. The scroll control 650 may be similar to that shown in the scroll control area 630 of FIG. 6, all of which, except as noted, operates the same or similarly to that described herein with respect to FIG. 4. To display the scroll control as active, scroll control display manager 250 may display the scroll control 650 in black, and to display it as inactive, scroll control display manager may display the scroll control 650 using a gray color.

Display the Labels, and Tab the Label Corresponding to the Selected Element.

When signaled, single tab display manager 220 displays the labels from the element records that have at least a portion designated between the left and right boundary of the label window 412 as indicated by the right edge of the element record and the right edge of the prior element record in the list plus one unit, or zero, for the first element record in the list.

For each such element record, single tab display manager 220 adds the label text to the label window 412, separated by blank space and a separator character or graphic, such as a vertical bar, in one embodiment according to its right edge and the right edge of the preceding element record, or zero if the element record is the first record in the list. If the width of the label text, defined by the right edge of the element record containing the label text, and the right edge, plus one unit, of the element record preceding the element record containing the label text in the list is partially, but not fully, within the boundaries of the label window 412, single tab display manager 220 displays, at or near the boundary that intersects it, a portion of the label text corresponding to the proportion of the width of the label text included within the boundaries of the label window. As noted, the left edge of the label in the first element in the list is considered to be at "0". As shown in FIG. 4, the label to the left of the label reading "LABEL 2" at the left side of label window 412 and the label to the right of the label reading "LABEL 4" are displayed in proportion to their width that is contained in the label window boundaries.

As described herein, labels contain text. However, in other embodiments, labels contain other visual indicators that may or may not include text. A label may include a graphic, a color, a video, audio, or any other indicator that helps a user identify the element to which the label corresponds.

Single tab display manager 220 displays no more than one label with a tab. As used herein, a tab is a visual indicator having an appearance similar to a conventional paper tab, the tab appearing to be connected to element window 410, such as by making the tab and element window have the same background color and the tab overlapping the border of the element window.

Although tabs are used as an indicator as described herein, the present invention may also apply to other forms of indicators to be used throughout this description in place of tabs. An indicator may be a highlighted label, or a highlighting of a label's background or an area near the label. The present invention applies to the display of a label, or the area near a label, in a manner that is different from the other displayed labels, so long as not more than one such label is displayed with an indicator at a single point in time.

Single tab display manager 220 displays the tab behind the label text corresponding to the element record having a selected value equal to true, as described above if the label text, or a portion thereof, is displayed in the label window 412 as described above. The other label texts are not displayed with a tab behind the label text. In FIG. 4, the element record having label text equal to "Label 4" has a selected field equal to true and therefore has a tab 418 displayed behind it.

As noted below, the user may adjust the label window boundaries using scroll controls 426, 428. It is possible that the user can scroll the label text corresponding to the selected element record completely off of the label window 412. In this case, single tab display manager 220 will not display any tabs in the label window 412.

When single tab display manager 220 has completed displaying the information in the element window as described herein, single tab display manager 220 signals element information display manager 222 that displays the information to which the element corresponds.

Display of the Information Corresponding to the Selected Element Record.

When signaled by single tab display manager 220, element information display manager 222 locates the record marked as selected and, using the handle to the file or other identifier of information stored in the record, displays some or all of the file or other information in element window 410. As noted above, element information display manager 222 displays the information with the same background as is used for the tab so that the tab appears to be part of, and sticking out from the top of, the element window 410 in the manner of a conventional tab.

In one embodiment, element information display manager 222 contains a conventional editor or other conventional user interface controls to allow a user to change the contents of the file or other information and optionally allows the user to save the changes, for example to a file. Element information display manager 222 receives commands or information from the user and changes the file or other information in accordance with those commands or information.

The User Adds More Elements

The user may desire that additional elements be added to the list of elements in element information storage 212 that are capable of being displayed, which may be added using a method described above. When the user adds another element to system 200, element addition manager 210 creates a new element record and signals scroll control display manager 250 as described above. Scroll control display manager 250 then proceeds as described above.

The User Moves the Mouse in the Label Window

In the course of using system 200, the user may choose to move the mouse cursor over various parts of label window 412. When the mouse cursor is moved within the boundaries of label window 412, the operating system signals window manager 216 and provides the screen coordinates of the mouse. Windows manager 216 maintains in the element information storage 212 the screen coordinates of the label window 412 whenever the application window containing the label window 412 is initialized, moved or resized. When the coordinates of the mouseover are inside the boundaries of the label window 412, window manager 216 subtracts the screen coordinate of the left edge of the label window 412 from the x screen coordinate of the mouse and subtracts the screen coordinate of the top of the label window 412 from the y screen coordinate of the mouse and provides the resulting coordinates to mouseover manager 230.

When mouseover manager 230 receives the resulting coordinates of the mouse cursor, mouseover manager 230 checks to see over which label display the mouse cursor is positioned. To do so, mouseover manager 230 adds the x-coordinate corresponding to the mouse cursor it receives to the left boundary of the label window, and compares the result with the label edges of each element record until mouseover manager 230 determines over which label, if any, the mouse is positioned. In one embodiment, mouseover manager 230 does not consider the mouse to be positioned over a label if the mouse is within a threshold number of pixels of a label edge or the left edge or right edge of label window 412 or is within a threshold number of pixels of the top or bottom of label window 412. In one embodiment, the height of label window 412 is stored in element information storage 212 by window manager 216 to allow mouseover manager 230 to determine bottom of the label window.

If the mouseover manager 230 determines the mouse is not positioned over a label, mouseover manager 230 checks the element records in element information storage 212 to determine if any of them have a value of a highlighted variable that is equal to "true". If so, mouseover manager 230 sets the value of the highlighted variable to "false" and signals single tab display manager 220.

If mouseover manager 230 determines the mouse cursor is over a label, and determines which label display the mouse cursor is over, mouseover manager 230 checks to see if that label display corresponds to an element with a record in element information storage 212 that is already marked as selected or highlighted. If the record corresponding to the label display over which the mouse cursor is positioned is already marked as selected or highlighted, mouseover manager 230 does not perform the actions described below. Otherwise, mouseover manager 230 marks the element record as highlighted and, in one embodiment, unmarks any other element record as highlighted although in another embodiment, any such record will already be unhighlighted as the user moves the mouse out of the area corresponding to its label.

When mouseover manager 230 has completed marking a record as highlighted or unmarking a record as highlighted, mouseover manager 230 signals single tab display manager 220.

When so signaled, single tab display manager 220 displays the contents of the label window as described above. However, if an element record is marked as highlighted, the label text is displayed differently (e.g. underlined) from the label text from element records not marked as highlighted (e.g. they are not highlighted).

The User Clicks in the Label Window

The user may attempt to select an element corresponding to a label in label window 412 by positioning the mouse cursor over an area in label window 412 and clicking the mouse button. If the user clicks the mouse button in label window 412, the operating system signals window manager 216. Window manager 216 requests the screen coordinates of the mouseclick from the operating system, and, if the mouseclick was in the label window, window manager 216 subtracts the coordinates of the upper left hand corner of the label window 412 from the corresponding screen coordinates as described above and provides the resulting coordinates to selection manager 240.

Selection manager 240 receives the resulting coordinates of the point on which the mouse clicked per the instructions of scroll control display manager 250 as described above. When selection manager 240 receives the coordinates of the mouseclick, selection manager 240 adds the left boundary of the label window to the x-coordinate and checks to see if the mouse click was made on a label display in the same or similar manner as mouseover manager 230 used to determine whether the mouse was over a label. In one embodiment, selection manager 240 uses the same threshold amounts as mouseover manager 230 to determine whether a mouse click corresponds to a label as described above, and in another embodiment, selection manager 240 uses different threshold amounts that mouseover manager 230.

Once selection manager 240 determines on which label display the mouse click was performed, selection manager 240 checks the corresponding record in element information storage 212 to see if the record is already marked as selected. If the record is already marked as selected, selection manager 240 does not perform any further action. If the record is not marked, selection manager 240 marks the record as selected as described above and unmarks any other record that had been marked as selected as described above.

Selection manager 240 then determines if the label display clicked on by the user is only partially displayed in label window 412, by comparing the left boundary of the label window with the left edge of the selected element record, and comparing the right edge of the label window with the right edge of the element record prior to the selected element record, (if the selected element record is the first element record in the list, such left edge is considered to be zero). If the right edge of the selected element record is greater than the right boundary of the label window 412 or the left edge (defined as the right edge of the prior element record or zero, if there is no prior element record) of the selected element record is less than or equal to the left boundary of the label window, selection manager 240 adjusts the boundaries of the label window 412 to fully encompass the edges of the selected element record.

In one embodiment, if selection manager 240 adjusts the boundaries of the label window, it adjusts the boundaries so that, if there is an other element having a label that would be displayed past the edge of label window nearest the selected element, selection manager 240 adjusts the label window boundaries so as to allow that other element to be partially within the boundary of the label window 412. In one embodiment, when such an adjustment of the label window boundaries is made, the boundaries are adjusted to ensure that element labels on each end of the label window that will be partially within the label window boundaries have an equal proportion or an equal amount that will be within the label window boundaries. For example, in FIG. 4, the label window boundaries are adjusted as shown when label 4 is selected.

When selection manager 240 has completed marking as selected the element record corresponding to the selected element and optionally adjusting the boundaries of the label window, selection manager 240 signals scroll control display manager 250, which operates as described above.

The User Changes the Text of A Label

The user may use a user interface provided by element edit manager 214 to modify the label text of the element record marked as selected. For example, the user may right click in the label window to indicate that the user wishes to change the label associated with the selected element.

Window manager 216 receives the right click and requests and receives the screen coordinates of the mouse cursor at the time of the right click. If window manager 216 determines that the mouse was right clicked while in the label window 412, window manager 216 displays a menu that the user may use to indicate a variety of commands, one of which may be to change the label displayed under the tab. If the user selects that menu item, window manager 216 signals element edit manager 214.

Element edit manager 214 displays a user interface to allow the user to make changes to the label text displayed over the tab. For example, element edit manager 214 may display a text box, prefilled with the label text from the element record marked as selected and allows the user to change the text (or keep it the same) and submit the desired text of the label, e.g. via an "OK" button. When the user presses the OK button, element edit manager 214 receives the desired label text from the user via the user interface and the operating system.

The user may also change the label of an element by saving an unsaved element, or "saving as" a new name. In such embodiment, the user may use a menu command from a menu displayed by window manager 216. Window manager 216 provides an indication of the command to element information display manager 220, which prompts the user, receives the file name, saves the file and provides the name to element edit manager 214.

Element edit manager 214 checks the record in element information storage 212 for the original label text width corresponding to the record whose label text the user just modified. Element edit manager 214 internally stores the width of the original label text and then removes the original label text from the record in element information storage 212. Element edit manager 214 stores the new label text in the corresponding record in element information storage 212, determines the length of the new label text via the operating system using conventional methods, and compares the width of the new label text with the width of the original label text. If the newly designated label text has a different width from the original label text, element edit manager 214 calculates a difference and stores the new value of right label edge 416 of the label display by adding the difference to the right label edge of the element record marked as selected.

Element edit manager 214 then checks to see if there is at least one element record succeeding the selected element record in the order of the list of element records in element information storage 212. If there is at least one element record succeeding the element record with the newly modified label text, element edit manager 214 retrieves, adds the difference to, and stores each right label edge 416 of each subsequent element record stored in element information storage 212. Element edit manager 214 then signals scroll control display manager 250 which receives the signal and proceeds as described above.

If the length of the new label text does not differ from the length of the old label text, element edit manager 214 does not alter any left or right label edges 414, 416 and signals single tab display manager 220, which operates as described above.

The User Removes an Element from the Display/List

The user may choose to remove an element from being displayed in label window 412 by first selecting the element as described above and using a user interface provided by element window manager 216 to remove the selected element. For example, the user may indicate via a main menu to close the file corresponding to the selected element record. When the user so indicates, the operating system signals window manager 216, which signals element removal manager 260.

When so signaled, element removal manager 260 prepares to remove the selected element record from the list of element records in element information storage 212. Element removal manager 260 marks a different element record in element information storage 212 as selected as described above so that one element will remain marked as selected. In one embodiment, the element record newly marked as selected is the element immediately succeeding or preceding the element to be removed in the list of elements. In one embodiment, the element newly marked as selected is the first element on the list.

In one embodiment, the element record newly marked as selected is the next-most recently selected element, which element removal manager 260 determines by checking a record maintained by selection manager 240 in element information storage 212 that contains an indication of which element was most recently selected. Selection manager 240 updates this record with a pointer to, or identifier of, the element marked as selected before selection manager 240 marks an unselected element record as selected as described above.

Element removal manager 260 then recalculates the right label edge 416 of the label display of each element subsequent to the removed element in the order of the list stored in element information storage 212 by subtracting, from the right edge of each element record subsequent to the element to be removed in the order of the list, the width of the label text of the removed element.

In one embodiment, the element record contains an indication of whether the file or other information to which the element record corresponds has been changed since the file or other information was last saved, such indication provided by element information display manager 222 as the user makes changes to the file or other information. If the element being removed has been otherwise modified and the changes to the element contents have not been stored (i.e. saved) prior to an indication of removal by the user, element removal manager 260 may prompt the user to save the contents of the element. If the user chooses to save the contents of the element, element removal manager 260 provides to element information display manager 222 a request to save the file corresponding to the element, and a pointer to the element or the handle to the file, and element information display manager 222 complies with the request. If the user does not chose to save the file or element, element removal manager 260 provides element information display manager 220 a request to close the file, including the handle to the file from the element record, and element information display manager 220 closes the file.

Element removal manager 260 then removes the element record corresponding to the element to be removed, and causes the element record following the removed element record to take the place of the removed element in the order of the elements in the list. In one embodiment, the list of element records is a linked list, with each element record containing a pointer to the next element in the list, plus a first element pointer. To remove an element record, element removal manager 260 causes the pointer that pointed to the removed element to point to the element to which the removed element pointed as the next item on the list, and then releases the memory held by the record corresponding to the removed pointer.

Element removal manager 260 then signals scroll control display manager 250, which proceeds as described above.

The User Clicks a Scroll Control

When window manager 216 receives a notification of a mouse click from the operating system, as noted above, window manager 216 retrieves the screen coordinates of the click. Window manager 216 then retrieves from the operating system the X- and Y-coordinates of the upper left hand corner of the window containing the scroll control area, and subtracts the X and Y coordinates of the window from the screen coordinates of the mouse click. If the resulting coordinates correspond to an area defined by the coordinates of the upper left hand and lower right hand corners of the scroll control area 430 that window manager 216 maintains in element information storage 216 when the window containing the scroll control area 430 is initialized, moved or resized, window manager 216 provides the resulting coordinates to scroll control operation manager 252.

The User Clicks on an Active Scroll Control

When it receives the coordinates of the mouseclick, scroll control operation manager 252 determines which scroll control 426, 428 was clicked over by comparing the X coordinate it receives to the two X coordinates that define each edge the scroll control area 430, stored by window manager 216 in element information storage 212 as described above, selecting the nearest one to the X coordinate received, and then identifying the scroll control 426, 428 that corresponds to that side of scroll control area 430.

Once scroll control operation manager 252 determines on which scroll control 426, 428 the mouse click was performed, checks element information storage 212 to see if the selected scroll control is marked as active. If the selected scroll control is marked as inactive in the corresponding record in element information storage 212, scroll control operation manager 252 does not perform any action. If the selected scroll control is marked as active, scroll control operation manager 252 modifies the boundaries of the label window 412 as will now be described.

When either or both scroll controls 426, 428 are active, when either scroll control 426 or 428 is clicked, scroll control operation manager 252 recalculates the boundaries of the label window 412 to display one additional full label in the label window, in the direction of the scroll control clicked. For example, scroll control operation manager 252 adjusts the boundaries of the label window so that a label partially displayed on the side of the label window 412 corresponding to the scroll control clicked will be fully displayed, and an additional label having an element record adjacent to the element record corresponding to such fully-displayed element record but not previously displayed, will be at least partially displayed, if any such element record exists. Scroll control operation manager 252 adjusts the boundaries of the label window 412 to attempt to ensure that, whenever there is an additional label with corresponding edges past each of either or both boundaries, a label is partially displayed at that boundary to provide further indication to the user that one or more additional labels extend past the boundary or boundaries, in addition to the indication provided by the active scroll control, in the manner described above.

In still another embodiment, each time a scroll control is clicked, scroll control operation manager 252 adjusts each of the boundaries by a set amount, or a percentage of the difference between the boundaries.

Once scroll control operation manager 252 has determined the new values of the boundaries of the label window, scroll control operation manager 252 stores the new values in the corresponding records in element information storage 212 and signals scroll control display manager 250 which proceeds as described above.

In one embodiment, scroll control operation manager 252 will treat a user holding the mouse button down over the scroll control for an extended period of time as if the user had clicked that scroll control multiple times, and the longer the user holds the mouse button down over the scroll control, the more times scroll control operation manager 252 treats the scroll control as being pressed.

To implement this behavior, when scroll control operation manager 252 responds to the mouse click of an active scroll control, scroll control operation manager 252 stores in element information storage 212 an indication of which of the scroll controls 426, 428 was clicked and sets an operating system timer, such as for an amount of 5 milliseconds.

When the timer elapses, the operating system signals scroll control operation manager 252, which checks to see that the leftmost boundary of the label window is not less than or equal to the left edge of the first element record in the list if an indication of the right scroll control 428 is stored as having been pressed as described above, or the rightmost boundary is not greater than or equal to the right edge of the last element record in the list if an indication of the left scroll control 426 is stored as having been pressed as described above. If either of these conditions are true, when scroll control operation manager 252 operates as if the scroll control indication stored as described above as having been clicked on, was clicked on again. Scroll control operation manager 252 then repeats the process of setting and responding to the timer as described above unless the leftmost boundary of the label window is less than or equal to the left edge of the first element record in the list if an indication of the right scroll control 428 is stored as having been pressed as described above, or the rightmost boundary is greater than or equal to the right edge of the last element record in the list if an indication of the left scroll control 426 is stored as having been pressed as described above. In the embodiment in which each of the scroll control operations adjusts the boundaries by a fixed amount or a percentage of the difference between the boundaries, a smooth scrolling appearance is generated.

When the user releases the mouse, the operating system signals window manager 216, which signals scroll control operation manager 252, which cancels any operating system timer that when scroll control operation manager 252 had previously set.

The User Clicks the Scroll Control That Operates a Drop Down List.

Figure 6:
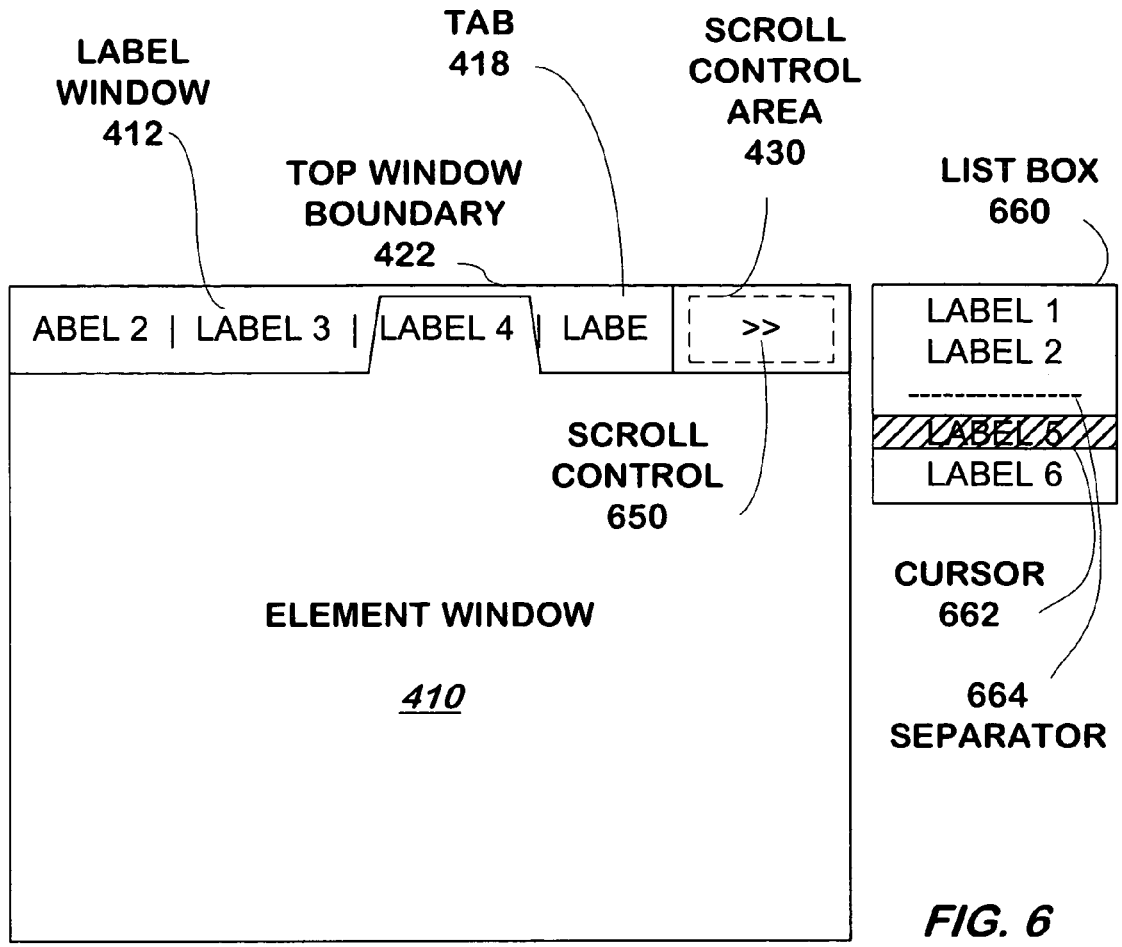
FIG. 6 is an illustration of a tabbed user interface similar to that of FIG. 4 according to one embodiment of the present invention.

As described above, in one embodiment, instead of the scroll controls described above or in addition to it, a scroll control 650 as shown in FIG. 6 is displayed as described above. FIG. 6 illustrates the window of FIG. 4 with the alternate scroll control 650 in place of the two scroll controls described above, and otherwise the window 410 operates as described with reference to FIG. 4. Referring additionally to FIG. 6, when the user clicks that control and scroll control operation manager 252 is notified in the manner described above for the scroll controls described above, and in response, scroll control operation manager 252 displays, nearby to the scroll control 650) a list box 660 containing some or all of the label text for the labels for elements that are not fully displayed in one embodiment, or are either not fully or partially displayed in another embodiment. In one embodiment, the label text for labels fully, or fully and partially, displayed in the label window 412 are not displayed in the list box 660 by scroll control operation manager 252. The appropriate edge of the element records are compared against corresponding left or right boundaries of the window by scroll control operation manager 252 to determine which labels to display.

In one embodiment, scroll control operation manager 252 displays the labels displayed in the list box 660 in the same order as they would be displayed in the label window 412, and in one embodiment, scroll control operation manager 252 also displays a separator 664 in the position of the labels in the list box 660 at which the labels not displayed in the list box 660 occur. As shown in the Figure, "Label 3" and "Label 4" are displayed in the label window 412 and are not displayed in list box 660, being replaced by a single separator 664 (in the illustration of FIG. 6, the labels have a number according to their order).

The user may move a cursor 662 in list box 660 to make a selection. If the user makes a selection, for example, by pressing the "enter" key, scroll control operation manager 252 is notified of the selection by the operating system, adjusts (or otherwise specifies as described below) the boundaries of the label window to include the selected label and marks that label as selected. Scroll control operation manager 252 then optionally sets a flag in element information storage 212 and signals single tab display manager 220 as described above.

In one embodiment, when scroll control operation manager 252 adjusts the boundaries of the label window, it does so by moving them in a small manner, or in the smallest manner possible. This will, for example, maintain in the label window 412 as many of the text of the labels that were previously displayed in the label window 412 before the selection was made as possible, or most of these, to ensure that the user's context is minimally disturbed. If none of the text of the labels formerly displayed will be displayed, as many of the text of the labels that are adjacent to the label text selected, on the side of such selected label nearest the text of the labels formerly displayed will be displayed. In one embodiment, portions of labels will nevertheless be displayed one or both ends of the label window to indicate that additional labels are outside the label window (if that is the case), as described herein.

In one embodiment, to adjust the boundaries of the label window when the user has selected the label text from a list as described herein, scroll control operation manager 252 adjusts the boundaries not by overwriting them, but by adding them to a scroll area of element information storage 212. When signaled, single tab display manager 220 checks the flag set as described above, and if it is set, single tab display manager 220 resets the flag, and adjusts the boundaries of the label window from their current values to the values appearing in the scroll area only by a maximum of $\frac{1}{40}$th (or another portion) of the width of the label window 412 at a time, redisplaying the label window each time, repeating this process until the ultimate boundaries are achieved, to produce an animated effect so that the user can identify where the labels that will drop off the label window have gone. Single tab display manager 220 then overwrites the boundaries of the label window using the values in the scroll area and removes those in the scroll area, and resets the flag.

The User Resizes the Window

The user may resize the window display using conventional methods. When the user completes the resize, the operating system, signals, makes available or provides to window manager 216 the screen coordinates of the top left corner and bottom left corner of the window corresponding to label window 412. Window manager 216 adjusts in element information storage 212 the size and/or locations of the label window 412, element window 410 and scroll control area 430 based on the size of the window, draws any borders to these, and sets a "resize" variable in element information storage 212 equal to left, right or none, indicating which side, if any, was altered in the resize, and signals scroll control display manager 250, which operates as described above.

When single tab display manager 220 displays the label window 412 as described above, if the resize variable is other than none, single tab display manager 220 adjusts the boundaries of the label window 412, expanding or contracting only the side of the label window 412 that was altered, as indicated by the resize variable in element information storage 212, holding the other boundary constant in a manner consistent with the new size of the label window 412.

Figure 3A:
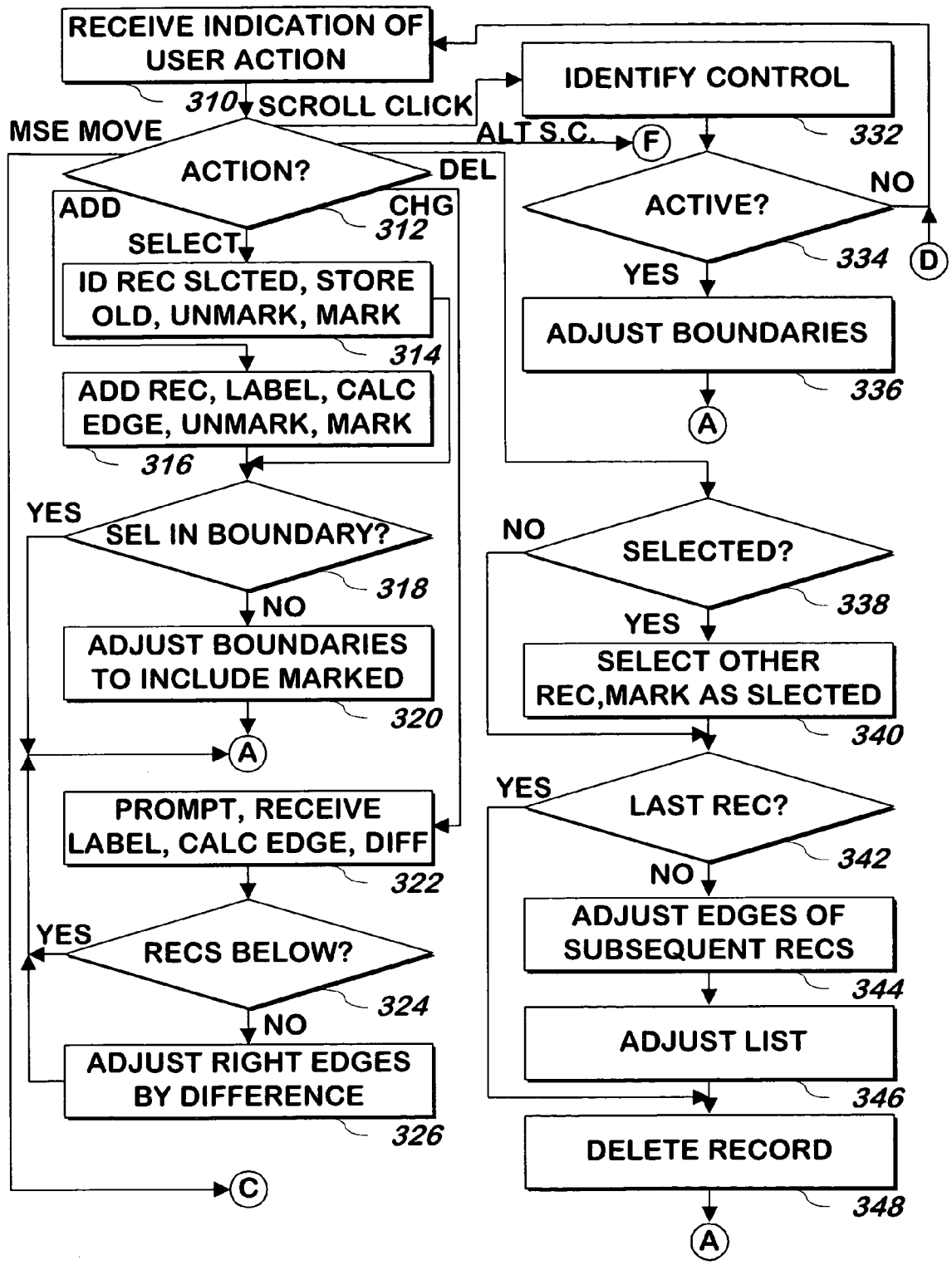
FIG. 3, consisting of FIGS. 3A, 3B, 3C and 3D is a flowchart illustrating a method of displaying a tabbed user interface according to one embodiment of the present invention.
Figure 3B:
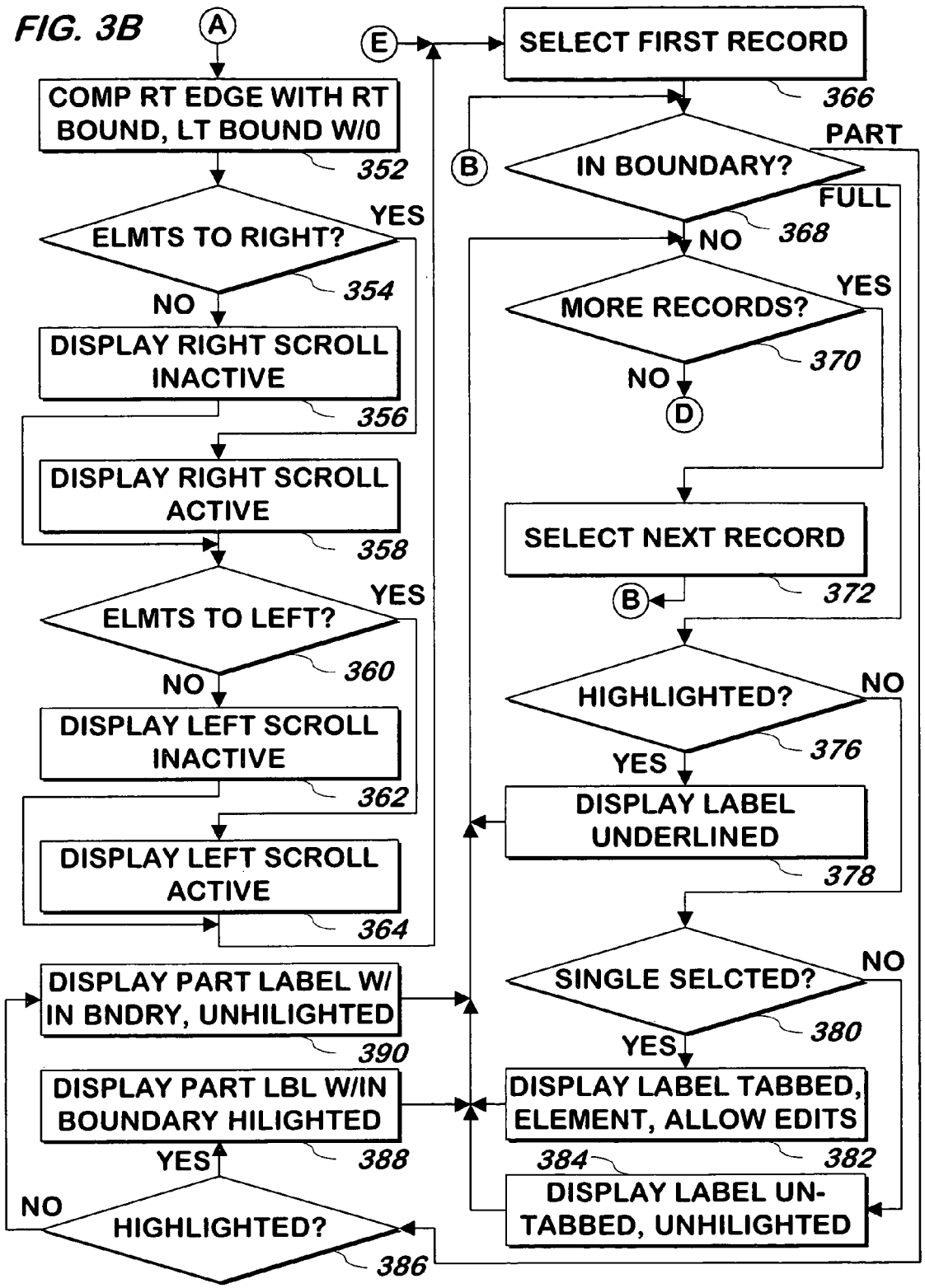
Figure 3D:
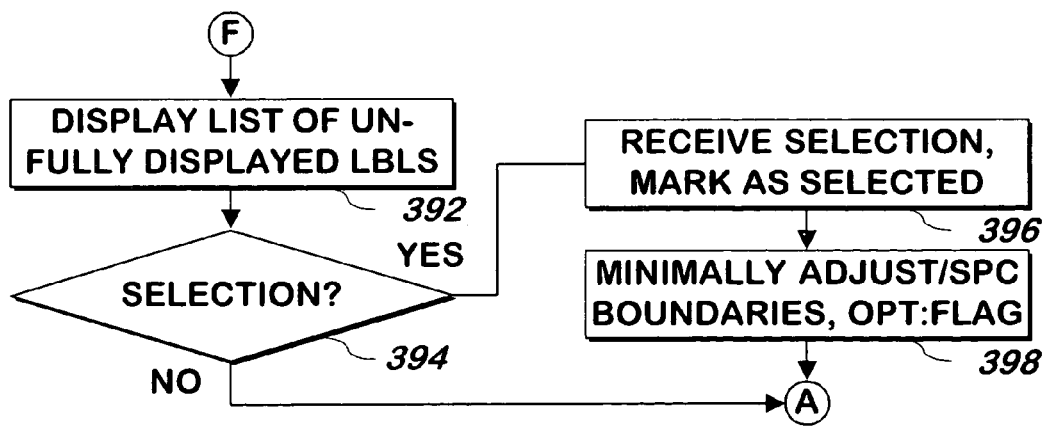

Referring now to FIG. 3, consisting of FIGS. 3A and 3B, 3C and 3D, a method of displaying labels corresponding to elements to be displayed is shown according to one embodiment of the present invention. In one embodiment, an element corresponds to a file, or other information that may be displayed to, and or altered by, a user. An indication of a user action is received 310. If the user action corresponds to the addition of an element 312 (e.g. a file open or file new command is selected from a menu), an element record is added as described above, including an initialized label, the right edge is calculated, any record marked as selected is unmarked and the added record is marked as selected as described above 316. If the record label is completely within the boundaries of the area in which labels are to be displayed 318, the method continues at step 352 of FIG. 3B and otherwise 318, the boundaries are adjusted 320 so that the left and right edges of the label of the newly added record are within the boundaries of the area in which labels are to be displayed and the method continues at step 352 of FIG. 3B.

If the action in step 310 is a select command 312, the record selected is identified as described above, an identifier of the formerly selected record is optionally stored, the formerly selected record is unmarked as selected and the record identified as the selected record is marked 314 and the method continues at step 318 as described above.

If the action corresponds to a request to change the label of a record or a command or other action that has the effect of changing the label of a record 312, the user is prompted for the new label and the difference between the old and new edges of the selected record is identified and the new edge is stored 322. If there are additional records whose labels would be displayed to the right of the label being changed and the difference identified in step 322 is not zero 324, the edges of such other records are adjusted using the difference 326 and the method continues at step 352 of FIG. 3B.

If the action corresponds to a mouse move within or out of the area in which labels are displayed 312, the method continues at step 328 of FIG. 3C. At step 328, if the action causes the mouse to be over a label as described above, any record marked for highlighting is unmarked in one embodiment (although in another embodiment, any such label will be unmarked as part of step 329, described below) and the label over which the mouse has been moved is identified and marked for highlighting 329 and the method continues at step 352 of FIG. 3B, and otherwise if the action causes the mouse not to be over a label 328, any record marked for highlighting is unmarked for highlighting 330 and the method continues at step 366 of FIG. 3B.

If the action of step 310 corresponds to a scroll button click 312, the scroll button clicked is identified 332 and if the scroll button clicked is not active 334, the method continues at step 310 and otherwise 334, the boundaries of the area in which labels are displayed are adjusted 336 as described above and the method continues at step 352 of FIG. 3B.

If the action of step 310 corresponds to an alternate scroll control click as described above 312, the method continues at step 392 of FIG. 3D. At step 392, a list of the undisplayed or not-fully-displayed labels are displayed in a drop down list as described above and the user is allowed to make a selection as described above. If a selection is not made or the user indicates that a selection will not be made, for example, by pressing the escape key) 394, the method continues at step 352 of FIG. 3B. Otherwise 394, the selection is received and the element record corresponding to the selected label is marked as selected 396 and the boundaries are minimally adjusted 398 as described above and the method continues at step 352 of FIG. 3B.

As noted above the boundaries may be separately specified instead of being adjusted and a flag set, and as part of the steps of FIG. 3B, the boundaries may be adjusted from their prior boundaries to the boundaries specified in increments to display the change as an animation. This may be performed by, before step 366 of FIG. 3B, performing the steps of FIG. 7A. Referring additionally to FIG. 7A, these steps include identifying whether the flag is set and if so 710, if the specified boundaries are different from the current boundaries of the label window 712, the current boundaries are adjusted 716 incrementally towards, and up to the boundaries specified, and the method continues at step 366. If the flag is not set 710, the method continues at step 366. If the boundaries are not different 712, the flag and the boundaries are cleared 714. After step 370, the step of FIG. 7B is performed. Referring additionally to FIG. 7B, if the flag is set 720, the method continues at step 710 instead of continuing at step 310 and otherwise 720, the method continues at step 310.

Figure 5:
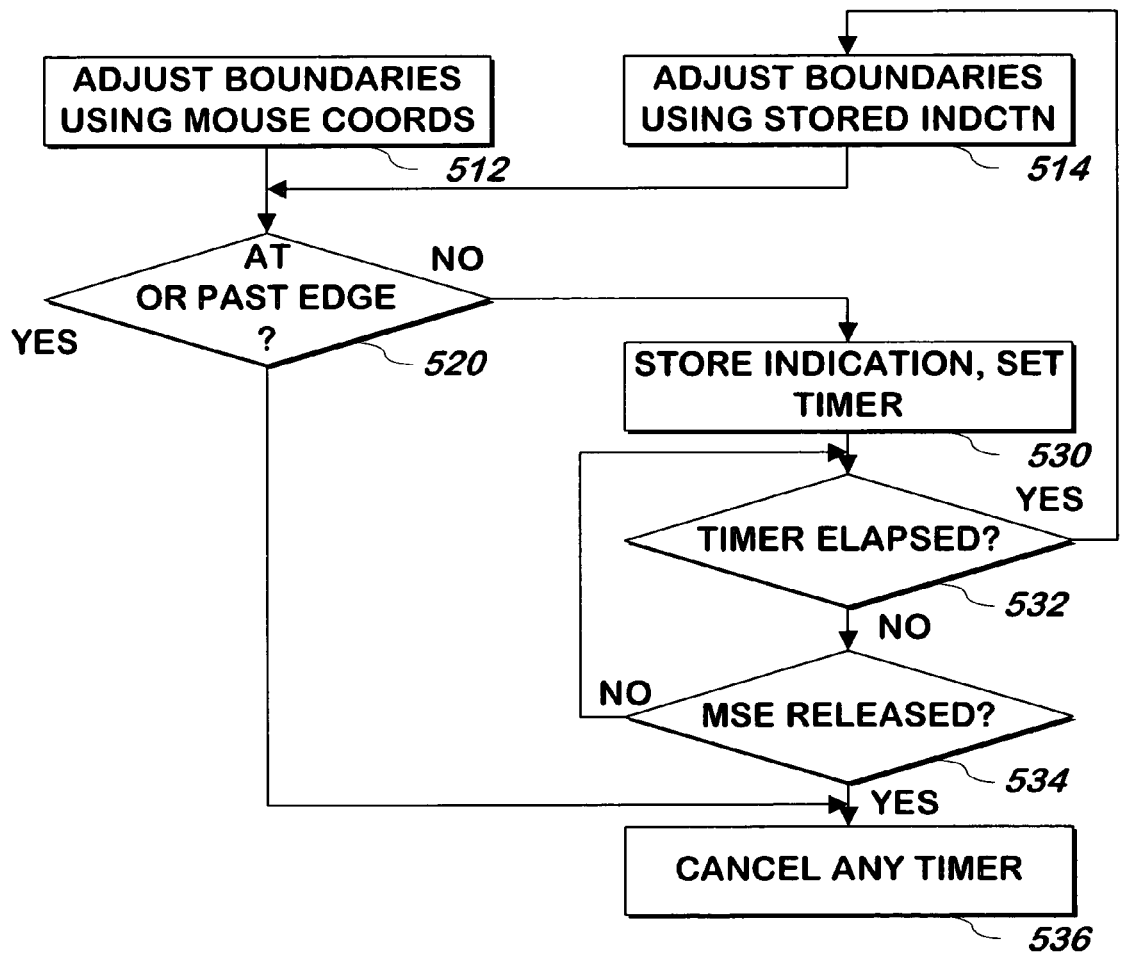
FIG. 5 is a flow chart illustrating a method of adjusting boundaries of an area in which labels are displayed in response to a mouse click of a scroll control according to one embodiment of the present invention.

Referring momentarily to FIG. 5, a method of adjusting the boundaries performed in step 336 of FIG. 3 is shown in more detail according to one embodiment of the present invention. The boundaries are adjusted 512 using the mouse coordinates of the mouse click and the determination of the active scroll control clicked, and if the left boundary is at or past the left edge of the first element record and the most recent mouse click was to the right scroll control, or the right boundary is at or past the right edge of the last element record and the most recent mouse click was to the left 520, the method continues at step 536 and otherwise 520, an indication of which scroll control was clicked is stored and a timer is set 530. If the timer has elapsed 532, the method continues at step 514 and otherwise 532, if the mouse button clicked to operate the scroll control is released 534, any timer set in step 530 is canceled 536 and otherwise 534, the method continues at step 532. If at step 532 the timer is elapsed, the boundaries are adjusted using the stored indication 514 in one embodiment, by the same amount as they were adjusted in step 512 and any prior iterations of step 514 or by an amount that will cause the left boundary to be at the left edge of the first element record if the most recent mouse click was to the right scroll control, or will cause the right boundary to be at the right edge of the last element record if the most recent mouse click was to the left scroll control, whichever is lower. The method continues at step 520.

Referring again to FIG. 3, if the action of step 310 corresponds to a deletion of a label and its corresponding record 312, if the label to be deleted is marked as selected 338, another label is marked selected 340 as described above and if the record to be deleted is the last record 342, the method continues at step 348. Otherwise 342, the edges of the records having labels that would be displayed to the right of the record to be deleted are adjusted as described above 344 and the list of records is adjusted as described above 346 the element corresponding to the record to be deleted is optionally saved, closed or both, and the record is deleted 348 and the method continues at step 352 of FIG. 3B.

At step 352 of FIG. 3B, the right edge of the last element record is compared with the right boundary of the area used to display the labels and the left boundary of the area used to display labels is compared with zero. If the right edge of the last element record is greater than the right boundary of the area 354, the right scroll control is displayed and recorded as active 358 and the method continues at step 360 and otherwise 354, the right scroll control is displayed and recorded as inactive 356 and the method continues at step 360.

At step 360 if the left boundary of the area used to display labels is greater than zero, the left scroll control is displayed and recorded as active 364 and the method continues at step 366, and otherwise 360, the left scroll control is displayed and recorded as inactive 358 and the method continues at step 366.

At step 366, the first element in the list of elements is selected and the edges of the label corresponding to the selected record are checked as described above to determine whether the label is entirely outside, entirely inside, or partly in and partly out of the boundaries for the area used to display labels. If the label for the selected element is entirely outside the boundaries 368, if there are no more records 370, the method continues at step 310. If there are more records 370, the next record in the list is selected 372 and the method continues at step 368.

If the label for the selected record is entirely inside the boundaries of the area used to display labels 368, if the label (e.g. via its element record) is marked for highlighting 376, the label is displayed at a location corresponding to its edge or edges, and in a highlighted manner, e.g. underlined 378 and otherwise, if it is the single label marked for display as selected (e.g. with a tab) 380, the label of the selected element record is displayed over a tab 382 at a location corresponding to its edge or edges and the method continues at step 370. Step 382 may also include displaying some or all of the element corresponding to such label, and allowing the user to edit the element. Otherwise 380, the label of the selected element record is displayed untabbed and unhighlighted 382 at a location corresponding to its edge or edges and the method continues at step 370.

If the edges of the element record selected in step 366 or 372 are partly within the boundaries of the area used to display labels 368, if the selected label is marked (e.g. via its element record) for highlighting 386, the portion of the label within the boundaries of the area used to display labels is displayed as described above in a highlighted fashion (e.g. underlined) at a location corresponding to its edge or edges 388 and the method continues at step 370. Otherwise 386, the portion of the label within the boundaries of the area used to display labels is displayed as described above in a non-highlighted fashion (e.g. underlined) at a location corresponding to its edge or edges 388 and the method continues at step 370.

What is claimed is:

1. A method of displaying labels in a single-tabbed interface, each of the labels corresponding to an element comprising data, the method comprising:
   accessing a collection of element records, each of the element records identifying an element label and having a data field indicating a selection state, no more than one of the element records having a selection state set to currently-selected;
   displaying, in a label display area, a displayed set of the identified labels, each of the labels in the displayed set occupying a position relative to each other in a single row in the label display area;
   displaying a control that, when manipulated, changes the displayed set to include other of the labels identified in the collection of element records, the control presenting at least one of the identified labels currently excluded from the displayed set, such that selection of the at least one label presented by the control effects an adjustment of boundaries of the label display area to include the selected label and as many of the labels included in the displayed set prior to the selection as possible;
   responsive to cursor movement near any one of the labels in the displayed set, highlighting the any one label to indicate that it is selectable;
   responsive to a selection of any one of the labels in the displayed set or the at least one label presented by the control, setting the selection state of the corresponding element record to currently-selected and changing the selection state of any other element record in the collection formerly set to the currently-selected state, so that no more than one of the element records in the collection at a time has a selection state set to currently-selected;
   when the displayed set includes the label corresponding to the element record having the currently-selected state, displaying in the label display area the label corresponding to the element record having the currently-selected state on a single tab that is graphically connected to element data displayed outside of the label display area, without changing the relative positions of the labels in the displayed set; and
   displaying, in the label display area, each of the labels in the displayed set that correspond to element records not having the currently-selected state without a tab, so that the displayed set of labels is displayed in conjunction with no more than one tab at any time.

2. The method of claim 1, wherein highlighting comprises underlining.

3. The method of claim 1, wherein displaying the displayed set of the identified labels comprises:
   partially displaying one of the labels near a boundary of the label display area so that less than all of the partially displayed label is viewable; and
   responsive to manipulation of the control:
      changing the label display area so that the label partially displayed is fully displayed in the label display area, and
      partially displaying near the boundary of the label display area a different identified label not previously in the displayed set so that less than all of the different label is viewable.

4. The method of claim 1, additionally comprising receiving at least one of the identified labels from a user.

5. The method of claim 1, wherein at least one of the labels in the displayed set of labels comprises an indicator other than text.

6. The method of claim 5, wherein at least one of the labels in the displayed set comprises video.

7. The method of claim 1, wherein displaying a control comprises displaying at least one of a scroll control and a list box.

8. The method of claim 1, wherein displaying the label corresponding to the element record having the currently-selected state on a single tab graphically connected to displayed element data comprises:
   displaying the element data in an element window, the element window having a border and a background area;
   displaying the tab and the background area of the element window in the same color; and
   displaying the tab so that it overlaps the border of the element window.

9. The method of claim 1, wherein the adjustment of boundaries of the label display area comprises an incremental adjustment of the boundaries to display an animated effect.

10. The method of claim 1, wherein the control presents the at least one of the identified labels currently excluded from the displayed set and a separator element representing identified labels included in the displayed set in an order corresponding to a display in the label display area.

11. The method of claim 1, wherein the adjustment of boundaries of the label display area to include as many of the labels included in the displayed set prior to the selection as possible comprises:
   maintaining in the label display area at least one of the labels included in the displayed set prior to the selection; and
   when none of the labels included in the displayed set prior to the selection are displayable with the selected label, then displaying in the label display area at least one label, not previously in the displayed set, at a location adjacent to the selected label on a side of the selected label nearest to the labels included in the displayed set prior to the selection.

12. A computer program product storing computer readable program code comprising instructions that, when executed, cause a computer system to perform operations comprising:

accessing a collection of element records, each of the element records identifying an element label and having a data field indicating a selection state, no more than one of the element records having a selection state set to currently-selected;

displaying, in a label display area, a displayed set of the identified labels, each of the labels in the displayed set occupying a position relative to each other in a single row in the label display area;

displaying a control that, when manipulated, changes the displayed set to include other of the labels identified in the collection of element records, the control presenting at least one of the identified labels currently excluded from the displayed set, such that selection of the at least one label presented by the control effects an adjustment of boundaries of the label display area to include the selected label and as many of the labels included in the displayed set prior to the selection as possible;

responsive to cursor movement near any one of the labels in the displayed set, highlighting the any one label to indicate that it is selectable;

responsive to a selection of any one of the labels in the displayed set or the at least one label presented by the control, setting the selection state of the corresponding element record to currently-selected and changing the selection state of any other element record in the collection formerly set to the currently-selected state, so that no more than one of the element records in the collection at a time has a selection state set to currently-selected;

when the displayed set includes the label corresponding to the element record having the currently-selected state, displaying in the label display area the label corresponding to the element record having the currently-selected state on a single tab that is graphically connected to element data displayed outside of the label display area, without changing the relative positions of the labels in the displayed set; and displaying, in the label display area, each of the labels in the displayed set that correspond to element records not having the currently-selected state without a tab, so that the displayed set of labels is displayed in conjunction with no more than one tab at any time.

13. The computer program product of claim 12, wherein highlighting comprises underlining.

14. The computer program product of claim 12, wherein displaying the displayed set of the identified labels comprises:

partially displaying one of the labels near a boundary of the label display area so that less than all of the partially displayed label is viewable; and responsive to manipulation of the control:

changing the label display area so that the label partially displayed is fully displayed in the label display area, and partially displaying near the boundary of the label display area a different identified label not previously in the displayed set so that less than all of the different label is viewable.

15. The computer program product of claim 12, wherein the operations additionally comprise receiving at least one of the identified labels from a user.

16. The computer program product of claim 12, wherein at least one of the labels in the displayed set of labels comprises an indicator other than text.

17. The computer program product of claim 16, wherein at least one of the labels in the displayed set comprises video.

18. The computer program product of claim 12, wherein displaying a control comprises displaying at least one of a scroll control and a list box.

19. The computer readable medium of claim 12, wherein displaying the label corresponding to the element record having the currently-selected state on a single tab graphically connected to displayed element data comprises:

displaying the element data in an element window, the element window having a border and a background area;

displaying the tab and the background area of the element window in the same color; and displaying the tab so that it overlaps the border of the element window.

20. The computer program product of claim 12, wherein the adjustment of boundaries of the label display area comprises an incremental adjustment of the boundaries to display an animated effect.

21. The computer program product of claim 12, wherein the control presents the at least one of the identified labels currently excluded from the displayed set and a separator element representing identified labels included in the displayed set in an order corresponding to a display in the label display area.

22. The computer program product of claim 12, wherein the adjustment of boundaries of the label display area to include as many of the labels included in the displayed set prior to the selection as possible comprises:

maintaining in the label display area at least one of the labels included in the displayed set prior to the selection; and when none of the labels included in the displayed set prior to the selection are displayable with the selected label, then displaying in the label display area at least one label, not previously in the displayed set, at a location adjacent to the selected label on a side of the selected label nearest to the labels included in the displayed set prior to the selection.

23. A system, comprising:

a processor; and storage, coupled to the processor, including executable instructions for performing operations comprising:

accessing a collection of element records, each of the element records identifying an element label and having a data field indicating a selection state, no more than one of the element records having a selection state set to currently-selected;

displaying, in a label display area, a displayed set of the identified labels, each of the labels in the displayed set occupying a position relative to each other in a single row in the label display area;

displaying a control that, when manipulated, changes the displayed set to include other of the labels identified in the collection of element records; the control presenting at least one of the identified labels currently excluded from the displayed set, such that selection of the at least one label presented by the control effects an adjustment of boundaries of the label display area to include the selected label and as many of the labels included in the displayed set prior to the selection as possible;

responsive to cursor movement near any one of the labels in the displayed set, highlighting the any one label to indicate that it is selectable;

responsive to a selection of any one of the labels in the displayed set or the at least one label presented by the control, setting the selection state of the corresponding element record to currently-selected and changing the selection state of any other element record in the collection formerly set to the currently-selected state, so that no more than one of the element records in the collection at a time has a selection state set to currently-selected;

when the displayed set includes the label corresponding to the element record having the currently-selected state, displaying in the label display area the label corresponding to the element record having the currently-selected state on a single tab that is graphically connected to element data displayed outside of the label display area, without changing the relative positions of the labels in the displayed set; and displaying, in the label display area, each of the labels in the displayed set that correspond to element records not having the currently-selected state without a tab, so that the displayed set of labels is displayed in conjunction with no more than one tab at any time.

24. The system of claim 23, wherein highlighting comprises underlining.

25. The system of claim 23, wherein displaying the displayed set of the identified labels comprises:

partially displaying one of the labels near a boundary of the label display area so that less than all of the partially displayed label is viewable; and responsive to manipulation of the control:

changing the label display area so that the label partially displayed is fully displayed in the label display area, and partially displaying near the boundary of the label display area a different identified label not previously in the displayed set so that less than all of the different label is viewable.

26. The system of claim 23, wherein the operations comprise receiving at least one of the identified labels from a user.

27. The system of claim 23, wherein at least one of the labels in the displayed set of labels comprises an indicator other than text.

28. The system of claim 27, wherein at least one of the labels in the displayed set comprises video.

29. The system of claim 23, wherein displaying a control comprises displaying at least one of a scroll control and a list box.

30. The system of claim 23, wherein displaying the label corresponding to the element record having the currently-selected state on a single tab graphically connected to displayed element data comprises:

displaying the element data in an element window, the element window having a border and a background area;

displaying the tab and the background area of the element window in the same color; and displaying the tab so that it overlaps the border of the element window.

31. The system of claim 23, wherein the adjustment of boundaries of the label display area comprises an incremental adjustment of the boundaries to display an animated effect.

32. The system of claim 23, wherein the control presents the at least one of the identified labels currently excluded from the displayed set and a separator element representing identified labels included in the displayed set in an order corresponding to a display in the label display area.

33. The system of claim 23, wherein the adjustment of boundaries of the label display area to include as many of the labels included in the displayed set prior to the selection as possible comprises:

maintaining in the label display area at least one of the labels included in the displayed set prior to the selection; and when none of the labels included in the displayed set prior to the selection are displayable with the selected label, then displaying in the label display area at least one label, not previously in the displayed set, at a location adjacent to the selected label on a side of the selected label nearest to the labels included in the displayed set prior to the selection.

* * * * *

UNITED STATES PATENT AND TRADEMARK OFFICE
CERTIFICATE OF CORRECTION

PATENT NO. : 7,587,679 B1
APPLICATION NO. : 11/212940
DATED : September 8, 2009
INVENTOR(S) : Sundermeyer et al.

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 322 days.

Delete the phrase "by 322 days" and insert -- by 353 days --

Signed and Sealed this

Seventeenth Day of August, 2010

David J. Kappos
*Director of the United States Patent and Trademark Office*